(12) United States Patent
Srivatsa et al.

(10) Patent No.: US 12,231,451 B2
(45) Date of Patent: Feb. 18, 2025

(54) FOUNDATIONAL MODEL FOR NETWORK PACKET TRACES

(71) Applicant: INTERNATIONAL BUSINESS MACHINES CORPORATION, Armonk, NY (US)

(72) Inventors: Mudhakar Srivatsa, White Plains, NY (US); Davis Wertheimer, White Plains, NY (US); Franck Vinh Le, West Palm Beach, FL (US); Utpal Mangla, Toronto (CA); Satishkumar Sadagopan, Leawood, KS (US); Mathews Thomas, Flower Mound, TX (US); Dinesh C. Verma, New Castle, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 236 days.

(21) Appl. No.: 18/048,059

(22) Filed: Oct. 20, 2022

(65) Prior Publication Data
US 2024/0137375 A1   Apr. 25, 2024
US 2024/0236124 A9   Jul. 11, 2024

(51) Int. Cl.
*H04L 9/40* (2022.01)
*H04L 41/16* (2022.01)
*H04L 43/04* (2022.01)

(52) U.S. Cl.
CPC .......... *H04L 63/1425* (2013.01); *H04L 41/16* (2013.01); *H04L 43/04* (2013.01)

(58) Field of Classification Search
CPC ..... H04L 63/1425; H04L 41/16; H04L 43/04; H04L 41/142
See application file for complete search history.

(56) References Cited

U.S. PATENT DOCUMENTS

| | | | |
|---|---|---|---|
| 10,785,247 B2 | 9/2020 | Nikolaev et al. | |
| 11,574,053 B1* | 2/2023 | Chen | G06F 21/564 |
| 2021/0357307 A1 | 11/2021 | Deng et al. | |
| 2021/0357762 A1 | 11/2021 | Clement et al. | |
| 2022/0021695 A1 | 1/2022 | Papamartzivanos et al. | |
| 2022/0253691 A1* | 8/2022 | Rokka Chhetri | G06F 21/566 |

(Continued)

OTHER PUBLICATIONS

Bommasani, "On the Opportunities and Risks of Foundation Models", Center for Research on Foundation Models, arXiv:2108.07258, Jul. 12, 2022, 214p.

(Continued)

*Primary Examiner* — Mohammad W Reza
(74) *Attorney, Agent, or Firm* — Cantor Colburn LLP; Tihon Poltavets

(57) ABSTRACT

Embodiments related to using a foundational model for network packet traces. A technique includes receiving network traffic of a network and extracting features from the network traffic, the features having a function related to communications in the network. The technique includes generating tokens from the features, each of the features corresponding to a respective one of the tokens, training a machine learning model by inputting the tokens, the machine learning model being trained to output contextual embeddings for the tokens, and using the contextual embeddings to determine an anomaly in the network traffic.

17 Claims, 16 Drawing Sheets

(56) References Cited

U.S. PATENT DOCUMENTS

2023/0274003 A1\* 8/2023 Liu ..................... G06N 3/094
 726/26
2023/0359822 A1\* 11/2023 Boue ................... G06F 40/284

OTHER PUBLICATIONS

Devlin, "BERT: Pre-training of Deep Bidirectional Transformers for Language Understanding", arXiv:1810.04805, May 24, 2019, 16p.
Grace Period Disclosure: Le, "NorBERT: Network Representations through BERT for Network Analysis & Management",arXiv, Jun. 21, 2022, 8p.

\* cited by examiner

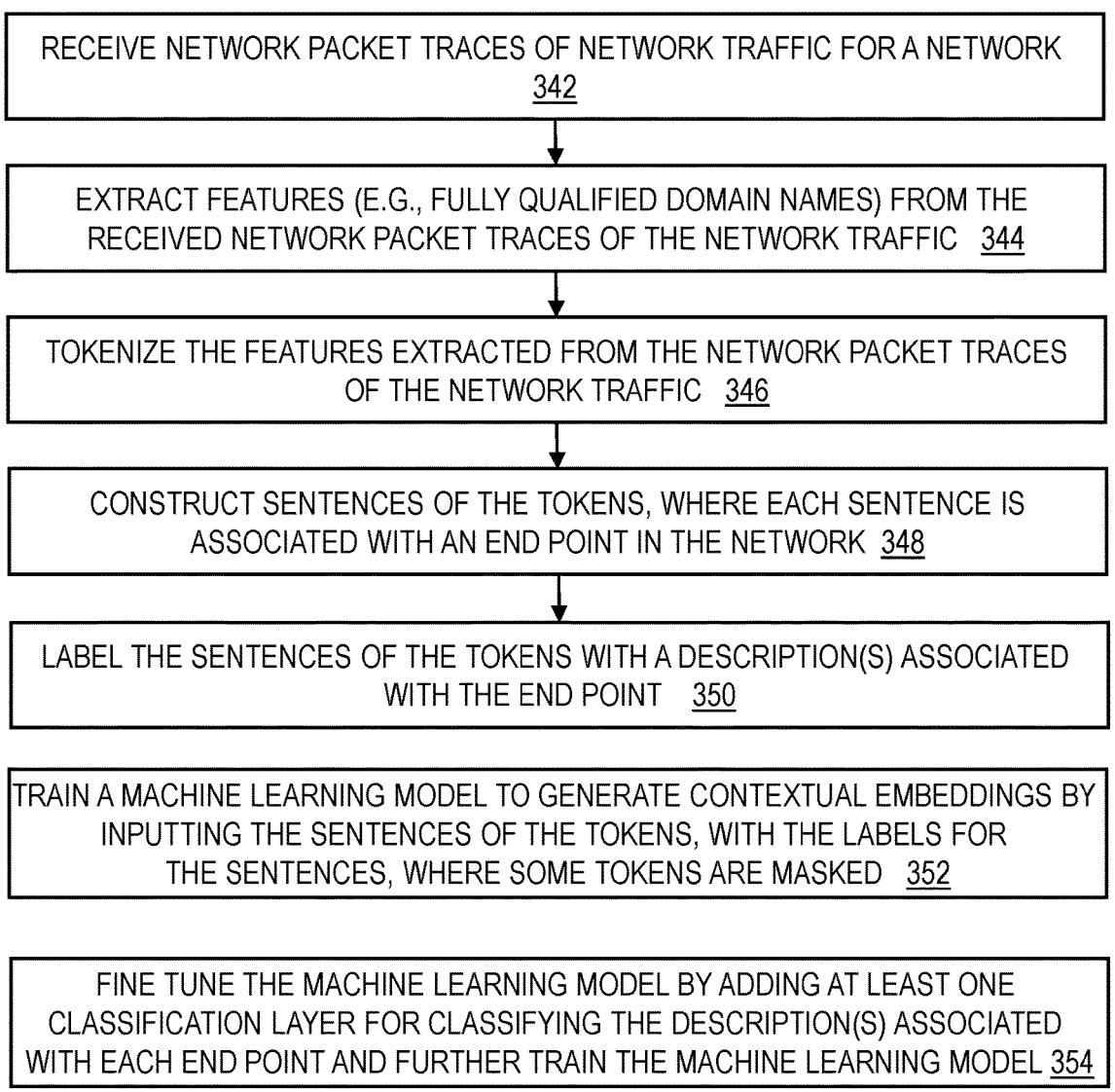

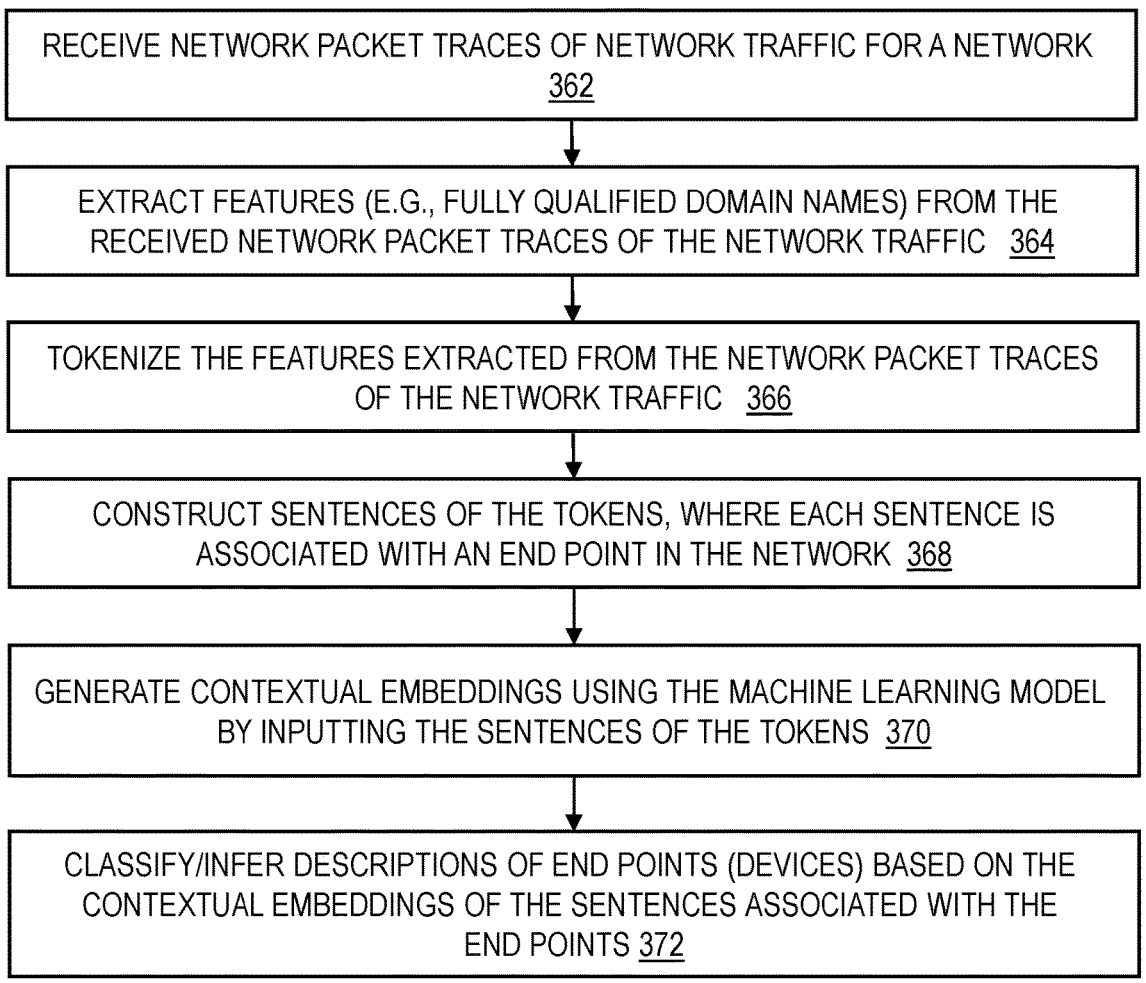

FIG. 4

TABLE 1

| VARIABLE | VARIABLE DESCRIPTION VALUE | VALUE |
|---|---|---|
| $D$ | Dimension of embeddings | 128 |
| $N$ | Number of successive FQDNs in a sequence | [8,16,32,64] |
| $k$ | Truncation level in FQDN hierarchy | 3 |
| $h$ | Number of BERT self-attention heads | 8 |
| $b$ | BERT batch size | 32 |
| $l$ | Number of attention layers | 4 |
| $l_r$ | Learning rate | 0.001 |
| $w$ | Weight decay | 0.01 |

FIG. 5

TABLE 2

| VARIABLE | VARIABLE DESCRIPTION VALUE | VALUE |
|---|---|---|
| $D$ | Dimension of embeddings | 128 |
| $N$ | Number of successive FQDNs in a sequence | 32 |
| $k$ | Truncation level in FQDN hierarchy | 3 |
| $h$ | GRU Number of BERT in the hidden state | 64 |
| $b$ | GRU batch size | 1024 |
| $l$ | GRU Number of recurrent layers | 2 |
| $l_r$ | Learning rate | 0.001 |

FIG. 6

TABLE 3

| Task | Embedding | Training Dataset Testing Subset (Training: Testing Split) | Independent Validation Dataset |
|---|---|---|---|
| Device Type | Random | 0.997 | 0.592 |
| | GloVe | 0.994 | 0.585 |
| | NorBERT | 0.998 | 0.965 |
| Manufacturer | Random | 0.996 | 0.588 |
| | GloVe | 0.998 | 0.726 |
| | NorBERT | 0.981 | 0.906 |

FIG. 7

TABLE 4

| FQDN | Nearest Neighbor |
|---|---|
| www.theatlantic.com<br>www.theguardian.com<br>getpocket.com<br>www.gq.com<br>www.fastcompany.com<br>www.harpersbazaar.com<br>www.theringer.com<br>www.wired.com<br>fivethirtyeight.com<br>www.politico.com | www.wired.com<br>www.wired.com<br>www.newyorker.com<br>www.buzzfeednews.com<br>www.wired.com<br>www.wired.com<br>lifehacker.com<br>www.nytimes.com<br>www.vox.com<br>www.wired.com |
| ctldl.windowsupdate.com<br>activity.windows.com<br>content.office.net | www.bing.com<br>edge.microsoft.com<br>time.windows.com |
| dscg.akamaiedge.net | dscj.akamaiedge.net |
| nvidia.github.io | download.nvidia.com |
| desktop-#####.#####.com<br>desktop-#####.#####.com<br>laptop-#####.#####.com | win-#####.#####.com<br>laptop-#####.#####.com<br>laptop-#####.#####.com |

FIG. 8

TABLE 5

| | | |
|---|---|---|
| mirrors.wcupa.edu | -8.886705 | 31.27709 |
| centos-distro.1gservers.com | -7.9791565 | 31.273209 |
| mirror.metrocast.net | -7.9935045 | 31.254797 |
| mirrors.clouvider.net | -8.053765 | 31.230501 |
| centos.vwtonline.net | -8.039425 | 31.224531 |
| ftpmirror.your.org | -8.013818 | 31.222664 |
| us.oneandone.net | -8.051469 | 31.2198 |
| mirror.jaleco.com | -8.023687 | 31.219189 |
| repos.eggycrew.com | -8.040249 | 31.210453 |
| mirrors.usinternet.com | -7.978715 | 31.20442 |
| registry-1.docker.io | -7.223346 | 31.19538 |
| auth.docker.io | -7.210015 | 31.194843 |
| mirrors.hoobly.com | -8.009627 | 31.185928 |

FIG. 9

TABLE 6

Packet Byte View

| 14 cc 20 51 33 ea 30 8c fb 2f ea b2 08 00 45 00<br>00 83 d2 9e 40 00 40 06 7f c2 c0 a8 01 6a 34 57<br>f1 9f 9f 3f 01 bb 05 70 2c 25 28 86 ab 7d 80 18 |
|---|

Protocol Level View

| Protocol field | Protocol value |
|---|---|
| Ethernet II Destination | 14 cc 20 51 33 ea |
| Ethernet II Source | 30 8c fb 2f ea b2 |
| Type | IPv4 (08 00) |
| IP Verion | 4 (4) |
| IP Header Length | 20 (5) |
| DiffServ | 00 (00) |
| IP Total Length | 142 (00 8e) |
| IP Identification | d2 9e |
| Flags | 02 (Don't fragment) (40) |
| ... | ... |

FIG. 10

TABLE 7

(Ethernet II Destination) (14 cc 20 51 33 ea)
(Ethernet II Source) (30 8c fb 2f ea b2) (Type) (IPv4)
(IP Verion) (4) ...

FOUNDATIONAL MODEL FOR NETWORK PACKET TRACES

STATEMENT REGARDING PRIOR DISCLOSURES BY THE INVENTOR OR A JOINT INVENTOR

The following disclosure is submitted under 35 U.S.C. 102(b)(1)(A):

DISCLOSURE(S): NorBERT: NetwOrk Representations through BERT for Network Analysis & Management, Franck Le, Davis Wertheimer, Seraphin Cabo, Erich Nahum, published Jun. 21, 2022, pages 1-8.

BACKGROUND

The present invention generally relates to computer systems, and more specifically, to computer-implemented methods, computer systems, and computer program products configured and arranged to use a foundational model for network packet traces.

An emerging paradigm for building artificial intelligence (AI) systems is based on a general class of models which are called foundation or foundational models. A foundation model is any model that is trained on broad data (e.g., generally using self-supervision at scale) that can be adapted (e.g., fine-tuned) to a wide range of downstream tasks. Current examples include BERT, GPT-3, and CLIP. A new language representation model is called BERT, which stands for Bidirectional Encoder Representations from Transformers. Unlike recent language representation, BERT is designed to pretrain deep bidirectional representations from unlabeled text by jointly conditioning on both the left and right context in all layers. As a result, the pre-trained BERT model can be fine-tuned with just one additional output layer to create state-of-the-art models for a wide range of tasks, such as question answering and language inference, without substantial task specific architecture modifications. From a technological point of view, foundation models are not new, but they are based on deep neural networks and self-supervised learning, both of which have existed for decades. However, the sheer scale and scope of foundation models from the last few years have increased. For example, GPT-3 has 175 billion parameters and can be adapted via natural language prompts to do a passable job on a wide range of tasks despite not being trained explicitly to do many of those tasks.

SUMMARY

Embodiments of the present invention are directed to computer-implemented methods for using a foundational model for network packet traces. A non-limiting computer-implemented method includes receiving network traffic of a network and extracting features from the network traffic, the features having a function related to communications in the network. The computer-implemented method includes generating tokens from the features, each of the features corresponding to a respective one of the tokens, training a machine learning model by inputting the tokens, the machine learning model being configured to output contextual embeddings for the tokens, and using the contextual embeddings to achieve different network management, monitoring, and security tasks, including classifying flows, and detecting anomalies.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3C is a flowchart of a computer-implemented method for training the machine learning model to generate contextual embeddings for tokens of categorical features of networks and further training the machine learning model by adding at least one classification layer to classify/determine at least one characteristic of end points in a network according to one or more embodiments of the present invention;

FIG. 3D is a flowchart of a computer-implemented method for classifying/inferring descriptions/characteristics for end points in a network based on network traffic of the end points, by using sentences of contextual embeddings that relate back to categorical features for the end points according to one or more embodiments of the present invention;

FIG. 4 depicts Table 1 which illustrates a summary of BERT hyperparameters and variables according to one or more embodiments of the present invention;

FIG. 5 depicts Table 2 which illustrates a summary of classifier hyperparameters and variables according to one or more embodiments of the present invention;

FIG. 6 depicts Table 3 which illustrates scores for classifying descriptions/characteristics for end point devices in the network by using different types of embeddings according to one or more embodiments of the present invention;

FIG. 7 depicts Table 4 which illustrates an excerpt of results from using nearest neighbors on contextual embeddings of fully qualified domain names according to one or more embodiments of the present invention;

FIG. 8 depicts Table 5 which illustrates an excerpt of fully qualified domain names and their coordinates in the two-dimensional projection according to one or more embodiments of the present invention;

FIG. 9 depicts Table 6 which illustrates the packet byte view and the protocol level view of network data according to one or more embodiments of the present invention;

FIG. 10 depicts Table 7 which illustrates a sentence of tokens representing a protocol field followed by its protocol value as an example representation of network data according to one or more embodiments of the present invention;

DETAILED DESCRIPTION

Figure 1:
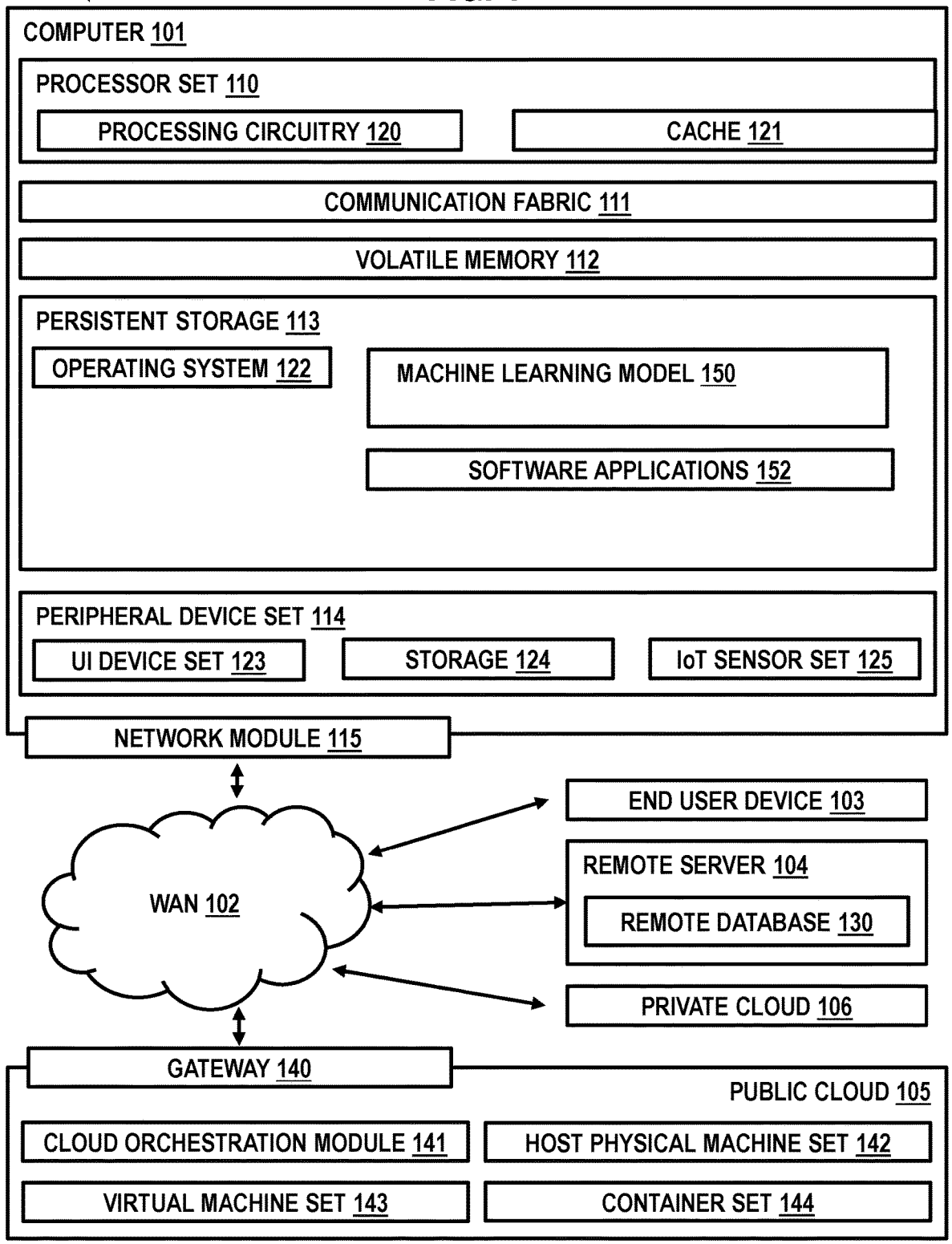
FIG. 1 depicts a block diagram of an example computing environment for use in conjunction with one or more embodiments of the present invention.

One or more embodiments of the invention describe computer-implemented methods, computer systems, and computer program products configured and arranged to use a foundational model for evaluating network packet traces of network traffic for a network and determining anomalies in the network traffic. A packet trace is a record of traffic traveling across the network. It is useful for investigating complex network problems related to both correctness and performance. There are various tools available for the capture of network packet data (e.g., iptrace, tcpdump, wireshark, tcpdump, and Q-Radar packet capture) and inspection of packet traces (e.g., Bro/Zeek, intel dpdk, and deep packet inspection based techniques in network firewalls and intrusion detection systems).

Deep neural network models have been applied to natural language processing (NLP) and image based tasks. For application to network analysis and detection of anomalies in network traffic for a network, one or more embodiments provide deep neural network models that can be effectively generalized to perform very well on multiple network tasks in different environments. Traditional deep models often rely on categorical features but cannot handle unseen categorical features/values. One method according to one or more embodiments for addressing such problems is to learn contextual embeddings for categorical features/variables used by deep neural networks in order to improve their performance. As discussed herein, one or more embodiments can adapt the NLP pre-training technique and associated deep model BERT to learn semantically meaningful numerical representations (contextual embeddings) for Fully Qualified Domain Names (FQDNs), protocol fields, protocol values, and/or other categorical features used in a communications network, which can be used to quickly detect anomalies and improve cyber security protection, or achieve other network management tasks (e.g., flow classification). One or more techniques of embodiments walk through a series of experiments illustrating that such techniques can be used to generate foundational models that maintain their effectiveness when applied to environments other than the one in which they were trained, thereby being modified for communication networks according to one or more embodiments.

In the state-of-the-art, work on analyzing network packet traces has used either a rule-based approach or a classical machine learning approach. Example rules include: allow tcp flows from 10.0.0/24 to port 80. Example machine learning models include: a random forest model to determine device type from domain name service (DNS) traffic. Rules have their advantages (e.g., rules do not require labeled training data and are fast to evaluate at wire speeds of approximately 10 gigabytes per second (Gbps)) and disadvantages (e.g., lack of expressiveness, lack of deep domain knowledge, lack of manual effort for authoring rules, and difficulty in handling green/brown field scenarios). Machine learning approaches have advantages (better expressiveness, ability to learn and adapt) and disadvantages (requires labeled training data). This limits the applicability of machine learning models to network packet traces.

One or more embodiments are directed to assisting network operators achieve a wide range of network traffic analysis tasks such as, for example, identify cameras, or more generally, identify devices by specific type and by vendor from passive network monitoring. Network operators do not have the a priori knowledge to manually create rules (e.g., identify devices from manufacturer XYZ). Also, training deep models to achieve those tasks often perform poorly when going into a new environment (e.g., a new network different from the network on which the deep learning model was trained). This is because the categorical features (e.g., DNS names) in a new environment may have new, unseen values. For example, in the training environments, devices may access the servers update.xyz.com; however, in the new target environment, those same devices may instead access software-update.xyz.com due to a software update. As another example, devices in the training environment may access the servers 'server-1234.east-.time.xyz.com' but may access the server 'server-4567.west-.time.xyz.com' in the target deployment environment, because of different geographic locations and server pools. Because the trained models may have never seen the values software-update.xyz.com, nor server-4567.west.time.xyz-.com, the prediction outcomes may be poor and often incorrect.

Because inventors recognize that large volumes of unlabeled network packet traces are easy to capture, the bottleneck is in labeling this data. Hence, one or more embodiments of invention utilize a foundational model approach to network packet traces that can pretrain (self-supervised) on large unlabeled data and post-train (supervised) on small-labeled data, thereby improving the time to train and use the foundational model as well as its effectiveness, according to one or more embodiments discussed herein.

Foundation models have been most successfully applied in natural language processing (NLP). As with network packet traces, there are large volumes of unlabeled text data (e.g., Wikipedia® dumps), but only small volumes of labeled data (e.g., sentiment scores on call center transcripts). Foundation models on NLP are trained in two steps: a pretrain (self-supervised) step on large unlabeled text data that attempts to predict masked word in sentences; and a post-train (supervised) step on small-labeled text data that specializes the model to a target problem (e.g., sentiment prediction). This allows one to "transfer" the knowledge encapsulated in a large unlabeled text corpus and leverage it on the smaller labeled text data. One possible task for pretraining is masking. A sentence is treated as a sequence of tokens (e.g., byte pair encodings (BPE) that may break up a word into multiple tokens) and a mask is randomly applied to a fraction of the input tokens. The goal of this pre-training task is to reproduce the original sentence given the masked input in the form using a deep neural networks (transformer based networks have become the de facto standard). Given a pre-trained network, a transfer learning approach is used to specialize the model for a target application, typically by re-training the weights on the last few layers of the network. To illustrate the technological solutions and benefits of one or more embodiments of the invention, the example is continued from above. By capturing unlabeled network traffic from the target deployment environment and applying features of one or more embodiments, embodiments can learn that server-4567.west.time.xyz.com is very similar to server-1234.east.time.xyz.com and that update.xyz.com is very similar to software-update.xyz.com. As such, the performance of the classifiers is significantly improved using the method of one or more embodiments.

According to one or more embodiments, a method is provided of training a foundational model on network packet trace data which can use a rule-driven approach to determine a network protocol (e.g., DNS, TCP, HTTP, SSL) for the network data. The method includes constructing tokens, which may be byte pair encodings (BPE) using knowledge of the network protocol (e.g., 4 octet IP address, 2 octet port numbers, HTTP headers, etc.). The method constructs a sentence with the tokens, for example, using BPEs in one network packet and constructs a document using sentences in one session (e.g., TCP/UDP/HTTP session). The method leverages knowledge of network packet encapsulation to build a tree structure over the BPEs. The tree structure can be the root which includes the {IP header, IP payload}, the IP Payload which includes {TCP header, TCP payload}, the TCP Payload which includes the {HTTP headers, HTTP payload}, and so forth. The method uses masking/corruption on the tokens (e.g., BPEs) in a sentence to train the foundational model. Masking is performed by leveraging (parsing) the tree structure from above, i.e., erasing/corrupting sub-trees including singleton tokens that are at the leaf nodes of the tree. This results in a trained foundational model that learns embeddings about the network traffic.

In another variation of one or more embodiments, customized tokenizers are applied to network packet traces. More specifically, when the input consists of a sequence of FQDNs, a tokenizer can truncate each FQDN to a k-th level in the DNS hierarchical structure, where k is a configurable parameter that allows users to control the vocabulary size. If the input consists of raw packet traces, a customizer tokenizer can convert a packet trace into a sequence of (protocol field, value) pairs.

Tokens can be input to the foundational model, and the foundational model generates embeddings for the tokens. Network packet traces may often exhibit longer range dependencies (spanning a full session). Using the embeddings output by the foundation model for tokens created from/with features of network packet traces, one or more embodiments are configured to capture long range dependencies using random 1-D convolutions and alpha pooling (all smooth variations between average and max pooling) on BPEs in a session.

The categorical features extracted from network packet traces of network traffic and used to make tokens are not meant to be limited. Various examples may discuss fully qualified domain names, protocol fields, and protocol values as examples of categorical features extracted from the network packet traces. It should be appreciated that other categorical features of network packet traces can be utilized as features from which to generate tokens, according to one or more embodiments.

The network traces from network traffic of a network may contain hundreds, thousands, and/or millions of network features, all of which is referred to as "big data". In accordance with one or more embodiments, the enormous size of network traces requires management, processing, and search by a machine (such as computer 101), for example, using computer-executable instructions, and network traces could not be practically managed, stored, analyzed, and/or processed as discussed herein within the human mind. According to one or more embodiments, the machine learning model is trained to generate contextual embeddings from the tokens of the categorical features of the network traffic. Embodiments can process (e.g., using cluster algorithms) the contextual embeddings to detect/determine anomalies in the end points (processing devices) of the network, which are related to cyber security breaches, unauthorized use, malware, ransomware, etc. Accordingly, these anomalies are corrected and mitigated using known techniques as understood by one of ordinary skill in the art. Accordingly, one or more embodiments improve the operations of computers and networks that connect computers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as machine learning model 150 using categorical features of network traffic of a network as tokens in order to generate contextual embeddings of the tokens. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
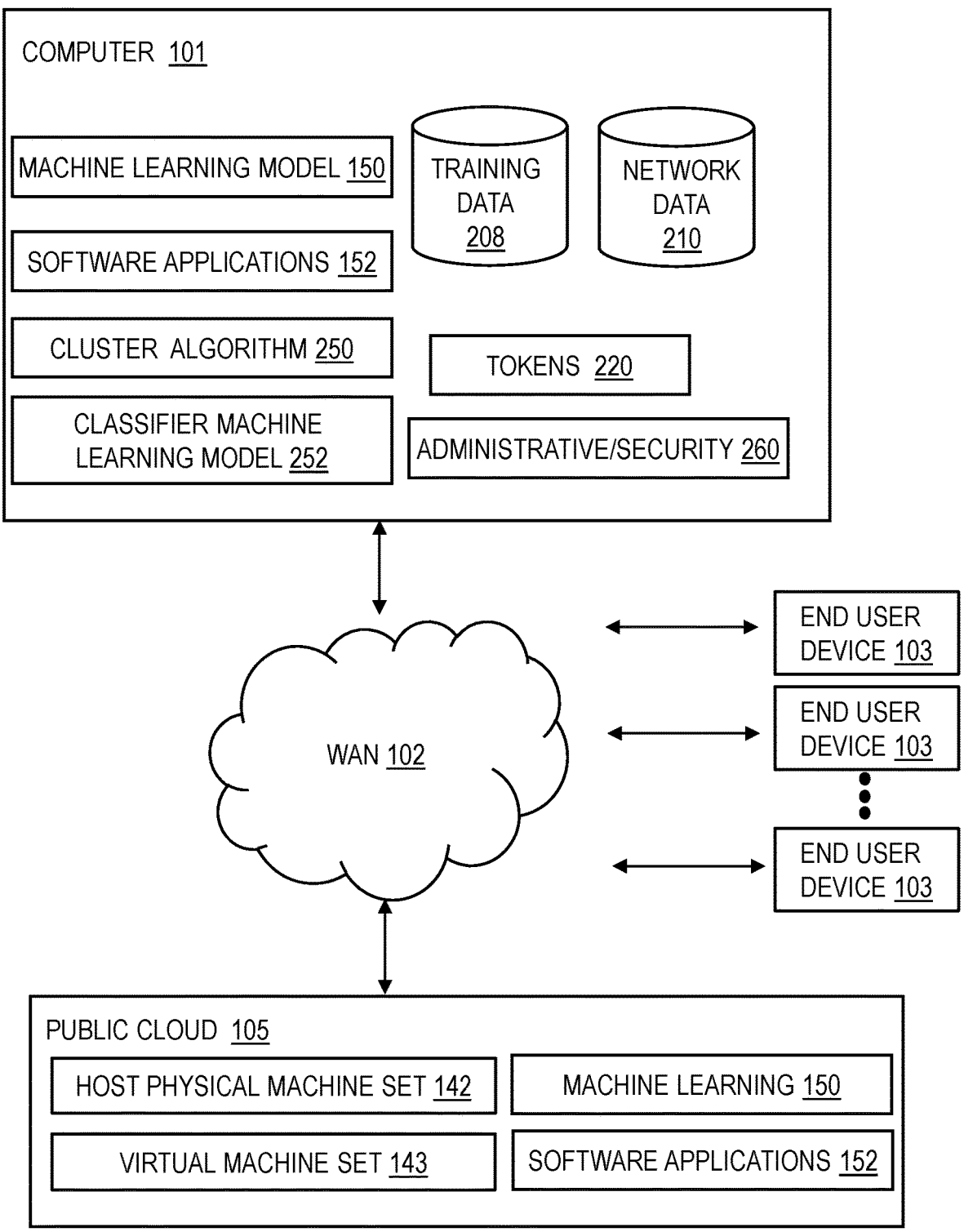
FIG. 2 depicts a block diagram of the example computing environment configured to use one or more machine learning models for evaluating network packet traces of network traffic in a network and to determining anomalies in the network traffic of the according to one or more embodiments of the present invention.

FIG. 2 depicts the computing environment 100 with further details for using a machine learning model 150 (e.g., a foundational model) for network packet traces of network traffic in a network and detecting/determining an anomaly in the network traffic of the network according to one or more embodiments. In one or more embodiments, administrative/security software tools 260 can be used to fix, isolate (electrically and/or physically), and stop the anomaly in the network traffic, using known techniques understood by one of ordinary skill in the art. In FIG. 2, some details of the computing environment 100 may be omitted so as not to obscure the figure while new details are presented. FIG. 2 illustrates numerous end user devices 103 connected to the WAN 102. In the computing environment 100, end points can be representative of as various devices or machines connected to a network such as WAN 102. In some cases, examples of the end points can include numerous end user devices 103, virtual machines of the virtual machine set 143, host physical machines (hosts) of the host physical machine set 142, UI devices of the UI device set 123, and IoT devices of the IoT sensor set 125, etc., along with any type of device operable to communicate over a network.

In one or more embodiments, a machine learning model 150 and/or software applications 152 may be executed in computer 101. In one or more embodiments, the machine learning model 150 and/or the software applications 152 may be executed in the public cloud 105. Further, although not shown in the public cloud 105 for conciseness, a clustering algorithm/model 250 and a classifier machine learning model 252 may be executed in the public cloud 105 as well as the computer 101.

Figure 3A:
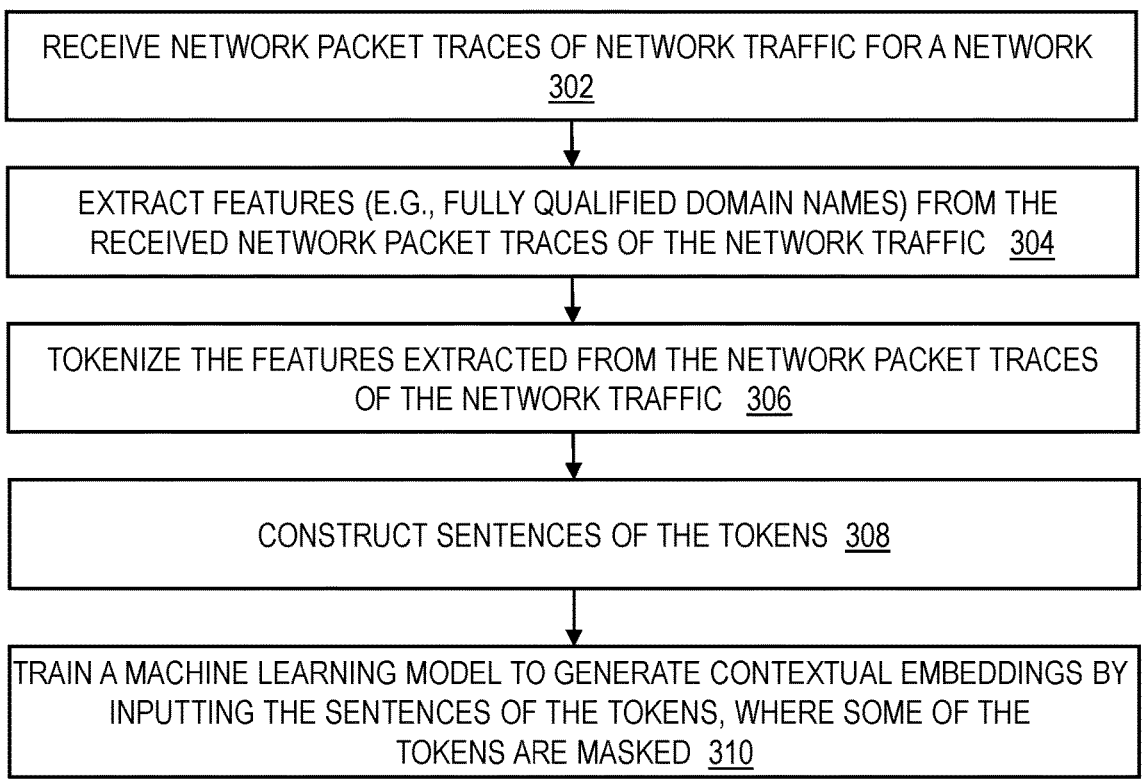
FIG. 3A is a flowchart of a computer-implemented method for training a machine learning model to learn embeddings for tokens of categorical features of networks and to output those embeddings with contextual meanings according to one or more embodiments of the present invention.

FIG. 3A is a flowchart of a computer-implemented method 300 for training the machine learning model 150 to learn contextual embeddings for tokens of categorical features of networks and to output those embeddings with contextual meanings according to one or more embodiments. In the describing the computer-implemented methods 300, 320, 340, and 360 in FIGS. 3A, 3B, 3C, and 3D respectively, reference can be made to any figures discussed herein. The machine learning model 150 can be a foundational model, which is a model that is trained on broad data (generally using self-supervision at scale) that can be adapted (e.g., fine-tuned) to a wide range of downstream tasks. In one or more embodiments, the machine learning model 150 may be a foundational model such as the bidirectional encoder representations from transformers (BERT), which is to be trained to learn semantically meaningful numerical representations, which are also called embeddings. In some cases, the machine learning model 150 can be a pretrained neural network model sometimes referred to as a deep learning model.

At block 302 of the computer-implemented method 300, the software application 152 is configured to receive network packet traces of network traffic for a network, such as the WAN 102 or any other communications network. Various techniques can be utilized for capturing network traffic flowing across a network as understood by one of ordinary skill in the art. The network packet traces or captured network traffic may be stored as network data 210. In some cases, the network data 210 of network traffic can be real-time network data and/or nearly real-time network data that has been captured off the network.

At block 304, the software application 152 is configured to extract categorical features (e.g., such as FQDNs, protocol fields, protocol values, etc.) from the received network packet traces of the network traffic.

At block 306, the software application 152 is configured to tokenize the categorical features extracted from the network traffic into tokens 220. An example of generating tokens for FQDNs is discussed. The tokenization is designed to incorporate the domain name system (DNS) which is a hierarchical naming system. An FQDN is a complete address for a website, computer, server, or similar entity that exists on the Internet. The FQDN includes three labels, including the hostname, second-level domain name, and top-level domain name (TLD), each separated by a period, ending with a trailing period.

The software application 152 can truncate/shorten each FQDN to a predetermined size (i.e., k), split the FQDN at the ".", and assign a length. More specifically, in a FQDN such as "server_xyz.service_abc.ibm.com", "com" is considered the root level, "ibm" is the top level domain, "service_abc" is the second level domain, etc. As such, the software application 152 is configured to exploit this structure and to define tokens by truncating the FQDN at a specified k-th level. For example, if k is set to 2, the domain "server_xyz.service_abc.ibm.com" is truncated to "service_abc.ibm.com", and "service_abc.ibm.com" becomes a token.

At block 308, the software application 152 is configured to construct sentences of the tokens 220. During training phase, the sentences of the tokens 220 are used as training data 208 for training the machine learning model 150. It is noted that the sentences of tokens 220 are also used during the inference phase, as will be discussed later. Each sentence is associated with its own end point, such that the sentence captures the network traffic of an end point. The end points can include end user devices 103, virtual machines of the virtual machine set 143, host physical machines (hosts) of the host physical machine set 142, UI devices of the UI device set 123, and IoT devices of the IoT sensor set 125.

As one example, the software application 152 can construct a sentence by concatenating the truncated FQDNs issued by an end point. It is assumed that an end point sends DNS requests for the following FQDNs: "server_x.service_abc.ibm.com", "server_y.service_cde.ibm.com", and "server_z.service_def.ibm.com". Then, the software application 152 derives the following sentence: "service_abc.ibm.com", "service_cde.ibm.com", "service_def.ibm.com", after truncating the FQDNs. More particularly, the software application 152 can concatenate either N (e.g., 512) tokens from a host, or all the tokens issued during a time interval (e.g., 60 minutes (mins), shorter than 60 mins, longer than 60 mins, etc.). For example, a sentence of tokens is generated for a session of an end point, where the session is a given time interval for which the end point communicates of the network (e.g., sends DNS requests). Each end point has its own sentence of tokens for the given time interval.

At block 310, the software application 152 is configured to train the machine learning model 150 to generate contextual embeddings by inputting the sentences of the tokens 220, where some of the tokens are masked. To perform masking, the tokens 220 may be input where some of the tokens are masked at random, and the machine learning model 150 predicts the values of the masked tokens. The masking can be performed using a masked language model. A fraction of the tokens may be masked in the sentences in order to train the machine learning model 150 (e.g., a BERT model).

Continuing the example scenario, each token (e.g., service_1.ibm.com) may be initially assigned a random numerical vector of D dimensions (e.g., 128). Through the BERT training, the value of each token will be adjusted. Particularly, when fed a sentence (e.g., "service_abc.ibm.com", "service_cde.ibm.com", "service_def.ibm.com") into BERT, each token is then assigned a contextual embedding (i.e., numerical vector of D dimensions).

After being trained, the machine learning model 150 is configured to output a contextual embeddings (i.e., a numerical representation, e.g., a numerical vector) for each of FQDN. If there are 200 FQDNs, then there are 200 contextual embeddings (i.e., numerical representations). Accordingly, for each input FQDN, the BERT model is configured to output a corresponding contextual embeddings (i.e., numerical representations). The parameters (i.e., weights of a neural network model) for the trained BERT model are saved, and therefore, the trained BERT model is configured to learn contextual embeddings (i.e., numerical representations) for FQDNs with semantic meaning.

Figure 3B:
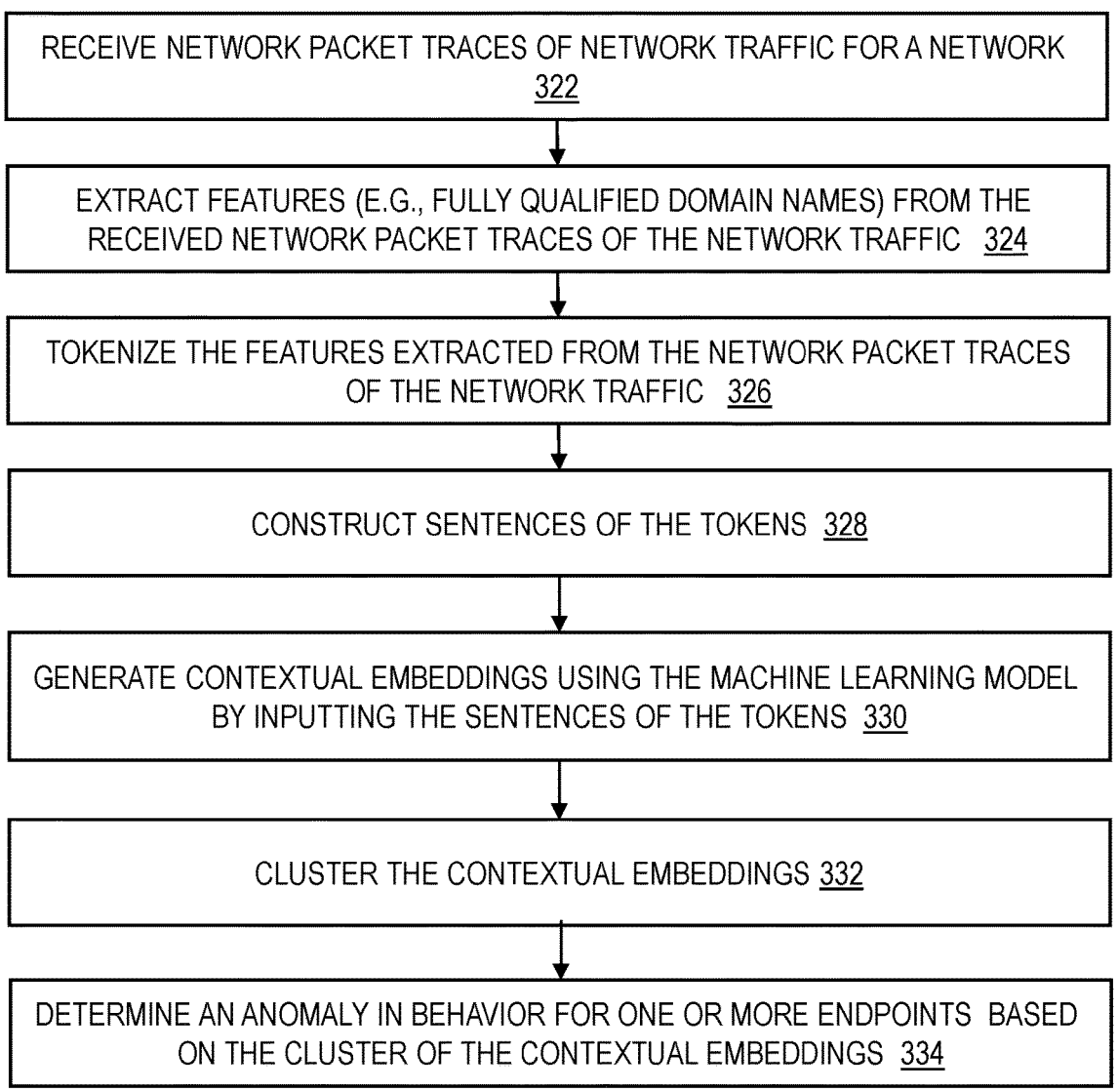
FIG. 3B is a flowchart of a computer-implemented method for using the trained machine learning model to generate contextual embeddings for tokens of categorical features of networks, such that those contextual embeddings with contextual meanings are used to detect anomalies in network traffic of a network according to one or more embodiments of the present invention.

FIG. 3B is a flowchart of a computer-implemented method 320 for using the trained machine learning model 150 to generate contextual embeddings for tokens of categorical features of network traffic, such that those contextual embeddings with contextual meanings are used to detect anomalies in network traffic of a network according to one or more embodiments. Blocks 322, 324, 326, and 328 in FIG. 3B are analogous to blocks 302, 304, 306, and 308 in FIG. 3A, and therefore will be discussed briefly.

At block 322 of the computer-implemented method 320, the software application 152 is configured to receive network packet traces of network traffic (e.g., network data 210) for a network, such as the WAN 102 or any other communications network. At block 324, the software application 152 is configured to extract categorical features (e.g., such as FQDNs, protocol fields, protocol values, etc.) from the received network packet traces of network traffic. At block 326, the software application 152 is configured to tokenize the categorical features extracted from the network traffic into tokens 220. At block 328, the software application 152 is configured to construct sentences of the tokens 220. Each sentence is associated with its own end point, such that the sentence captures the network traffic of an end point, thereby allowing the sentence (and the corresponding contextual embeddings) to uniquely define and correspond back to that end point.

At block 330, the software application 152 is configured to cause the machine learning model 150 generate and output contextual embeddings for the sentences of the tokens 220, in response to the input of the sentences by the software application 152.

At block 332, the software application 152 is configured to cause a cluster algorithm 250 to cluster the contextual embeddings of the sentences corresponding to end points. The contextual embeddings are numerical representations, for example, vectors of the tokens in a sentence. In some cases, an average of the contextual embeddings of the tokens for a sentence is computed, and the average of the contextual embeddings for each sentence is input to the cluster algorithm 250. As such, the average of the contextual embeddings for a sentence represents the end point from which the sentence of tokens was created. In one or more embodiments, the cluster algorithm 250 can be implemented as a trained machine learning model, such as neural network model, etc.

At block 334, the software application 152 is configured to determine one or more anomalies of the end points in the network traffic based on the cluster of the averages of the contextual embeddings. For example, the software application 152 is configured to identify one or more outliers in the averages of the contextual embeddings as the anomaly, and as such the corresponding end point can be isolated from the network and/or isolated from accessing sensitive databases in the network. In one or more embodiments, the software application 152 can compare the cluster of the averages of the contextual embeddings to a historical cluster of the averages of embeddings for the same network or a different network. The software application 152 can determine an anomaly based on at least one of the averages of the contextual embeddings being similarly positioned as the average of the contextual embeddings for an end point that had an anomaly (e.g., a data breach, cyber security problem, etc.) in the historical data.

Continuing the example scenario from above, each FQDN is assigned a numerical vector of D dimensions. The proximity between vectors can be computed using the cosine similarity, for example. Now that there are contextual embeddings as numerical representations for all the FQDNs in the network traffic (as the output from the BERT model), the contextual embeddings are input to the cluster algorithm/model 250 (e.g., using a nearest neighbors algorithm) which determines a potential security breach, determines that an end device (e.g., network device) is not connecting to the correct servers, determines that a network device has abnormal behavior indicative of malware/unauthorized usage, etc. The software application 152 can determine the anomaly (e.g., potential security breach, incorrect connection to server(s), malware/unauthorized usage) based on there being an outlier for at least one contextual embedding in the cluster generated by the clustering algorithm/model 250. The software application 152 can cause the anomaly to be fixed using techniques known by one of ordinary skill in the art, including isolating the end device causing the problem.

FIG. 3C is a flowchart of a computer-implemented method 340 for training the machine learning model 150 to generate contextual embeddings for tokens of categorical features of networks and further training (e.g., fine tuning) the machine learning model 150 by adding at least one classification layer (e.g., as the output layer), such that those contextual embeddings with contextual meanings are used to classify/determine at least one characteristic of the end point (device) in network according to one or more embodiments. Blocks 342, 344, 346, and 348 in FIG. 3C are analogous to blocks 322, 324, 326, and 328 in FIG. 3B respectively, and therefore will be discussed briefly.

At block 342 of the computer-implemented method 340, the software application 152 is configured to receive network packet traces of network traffic (e.g., network data 210) for a network, such as the WAN 102 or any other communications network. At block 344, the software application 152 is configured to extract categorical features (e.g., such as FQDNs, protocol fields, protocol values, etc.) from the received network packet traces of network traffic. At block 346, the software application 152 is configured to tokenize the categorical features extracted from the network traffic into tokens 220. At block 348, the software application 152 is configured to construct sentences of the tokens 220, where each sentence is generated from and associated with the network traffic for an end point in the network. Each sentence is associated with its own end point, such that the sentence captures the network traffic of that end point, thereby allowing the sentence (and the corresponding contextual embeddings) to uniquely define and correspond back to the end point.

At block 350, the software application 152 is configured to label each sentence of tokens with a description(s) (e.g., manufacturer (vendor) and/or device type) associated with the end point for which the sentence was created. For example, a given end point device may have a device type of "camera" and a manufacturer "JKL", and accordingly, the sentence of tokens for the given end point is correspondingly labeled with the device type "camera" and the manufacturer "JKL". All of the sentences are labeled accordingly.

At block 352, the software application 152 is configured to train the machine learning model 150 to generate contextual embeddings by inputting the sentences of tokens with the labels for the sentences, where some tokens are masked. This training allows the machine learning model 150 to learn contextual embeddings for the tokens and the descriptions (i.e., labels) for the sentences of contextual embeddings for the end points. It is noted that a previous sentence of tokens is not a sentence of contextual embeddings representing those tokens, and the sentence still has its label.

At block 354, the software application 152 is configured to fine tune the machine learning model 150 by adding at least one classification layer for classifying the descriptions/characteristics (i.e., labels) associated with each end point and further train the machine learning model 150. The classification layer may be an output layer in a neural network model. Further training to fine tune the machine learning model 150 may include using a training dataset that includes sentences of contextual embeddings (representing the previous tokens) for end points, where each of the sentences of the contextual embeddings labels the end points with, for example, device type and/or manufacturer.

In one or more embodiments, instead of fine tuning the machine learning model 150, a separate classifier machine learning model 252 (e.g., neural network model) can be trained and used to classify the end point by description(s)/characteristics (e.g., device type, manufacturer, etc.). For the classifier machine learning model 252, training is performed using a training dataset that includes sentences of contextual embeddings for end points, where each of the sentences of the contextual embeddings labels the end points with, for example, device type and/or manufacturer. As such, the classifier machine learning model 252 is trained to classify/infer end points (devices) by one or more descriptions/characteristics (e.g., device type and/or manufacturer) based on the input of the sentences of contextual embeddings for the end points.

FIG. 3D is a flowchart of a computer-implemented method 360 for classifying/inferring descriptions/characteristics for end points in a network based on network traffic of the end points, which includes using sentences of contextual embeddings that relate back to categorical features in network traffic for the end points according to one or more embodiments. Blocks 362, 364, 366, and 368 in FIG. 3D are analogous to blocks 342, 344, 346, and 348 in FIG. 3C respectively, and therefore will be discussed briefly.

At block 362 of the computer-implemented method 360, the software application 152 is configured to receive network packet traces of network traffic (e.g., network data 210) for a network, such as the WAN 102 or any other communications network. At block 364, the software application 152 is configured to extract categorical features (e.g., such as FQDNs, protocol fields, protocol values, etc.) from the received network packet traces of network traffic. At block 366, the software application 152 is configured to tokenize the categorical features extracted from the network traffic into tokens 220. At block 368, the software application 152 is configured to construct sentences of the tokens 220, where each sentence is generated from and associated with the network traffic for an end point in the network. Each sentence is associated with its own end point, such that the sentence captures the network traffic of an end point, thereby allowing the sentence (and the corresponding contextual embeddings) to uniquely define and correspond back to the end point. Unlike the training in FIG. 3C, no labels of the descriptions/characteristics of the end points are added to the sentences of tokens, because the trained machine learning model 150 (or classifier machine learning model 252) is configured to classify/infer the descriptions/characteristics, as discussed herein.

At blocks 370 and 372, the software application 152 is configured to cause the machine learning model 150 to generate contextual embeddings for the sentences of tokens, in response to inputting the sentences of tokens to the machine learning model 150 and further cause the machine learning model 150 to classify/infer descriptions/characteristics of the end points (e.g., devices) based on the contextual embeddings of the sentences associated with the respective end points.

In one or more embodiments, the classifier machine learning model 252 may be used to classify/infer the descriptions/characteristics of the end points. In this case, the software application 152 is configured to take the contextual embeddings of the sentences output from the machine learning model 150 and input them to the classifier machine learning model 252, thereby causing the classifier machine learning model 252 to classify/infer descriptions/characteristics of the end points (e.g., devices) based on the contextual embeddings of the sentences associated with the respective end points.

For ease of understanding and not limitation, section headers and section subheadings are provided to describe certain aspects of one or more embodiments. The section headers and section subheadings are intended to assist the reader.

I. Introduction

One or more embodiments are configured to provide foundational models to address unique challenges posed by computer and telecommunication systems. For example, local network configurations, geographic load balancing, or software updates can all cause deep neural network models to overfit the training data and perform poorly in the relevant outside environments.

To illustrate these problems, consideration is given to the task of detecting and classifying devices (e.g., manufacturer, operating system) present in a network from passive network monitoring. Because Internet of Things (IoT) devices are particularly vulnerable to attack because of their poor security, network administrators may wish to identify devices from specific manufacturers or types (e.g., cameras) to apply different policies (e.g., quarantine, network isolation, etc.). However, while connections to a server "server-54.useast-1.update.xyz.com" may reveal the presence of an IoT device from the manufacturer xyz, that same device may instead connect to a different server "server-27.us-west-2.update.xyz.com" when deployed in a different enterprise network because of geographic load balancing. Network administrators would immediately recognize that the device is accessing the same service, but through a server in a different data center and location for better performance. However, to a deep neural network, the fully qualified domain name (FQDN) "server-27.us-west-2.update.xyz.com" is instead a new unseen value. A deep device classifier may therefore perform poorly on the new enterprise network.

Similarly, devices running distinct software versions in different enterprise networks may cause deep models to perform well in the training environment but poorly in new settings. As an example, devices of interest may connect to the server "fwupdate.xyz.com" in the training setting, but devices from the same manufacturer in other enterprise networks may be running newer software versions and instead connect to "fw-update2.xyz.com". As in the prior example, the FQDN "fw-update2.xyz.com" is an entirely unseen value to the deep model, leading to poor performance in new settings.

To quantify the performance degradation, the inventors trained several Gated Recurrent Unit (GRU) models to predict the device type (e.g., TV, refrigerator, hub, camera, doorbell) and manufacturer (e.g., Amazon®, Apple®, Belkin®, Canary®, D-link®) of IoT devices, by analyzing their DNS traffic. All the models exhibit poor generalization performance. For example, the device type classifier achieves a weighted average F1-score of 0.997 across all classes on the validation dataset, defined as 25% of the entire training set (traditional train-test split validation approach), but its performance drops to 0.592 when applied to a different publicly available network trace.

Although the above examples demonstrate the problem in the context of device classification, the root cause is more general, and affects many other network analysis and management tasks. More specifically, traditional deep models' approaches often rely on categorical features, but cannot handle unseen categorical values: performance degradation stems from an inability to learn the semantic meanings of new categorical values. Instead, if deep models were able to learn that the newly observed FQDN "server-27.us-west-2.update.xyz.com" is actually semantically similar to "server-54.us-east-1.update.xyz.com", they may generalize better, as disclosed according to one or more embodiments of the invention. Even in other tasks not relying on FQDNs, relevant features may still be categorical in general, and so the capability to learn semantic meaning of newly encountered values is needed for generalization performance, as disclosed in accordance with one or more embodiments. For example, for security vulnerability analysis, resource management (e.g., scaling of Virtualized Network Functions), or congestion control/routing, respectively, deep models may take into account the secure sockets layer (SSL) cipher suite of connections, the cloud instance types/flavors, and the quality of service (QoS) or Explicit Congestion Notification (ECN) codes in IP packets, respectively, to determine the appropriate actions. However, state-of-the-art models cannot learn the semantic meanings of newly encountered values, which were not observed during training. Accordingly, one or more embodiments are configured to address these issues.

First, according to one or more embodiments, a methods adapts a natural language processing (NLP) pretraining technique and associated deep model called Bidirectional Encoder Representations from Transformers (BERT) to learn semantically meaningful numerical representations, referred to as embeddings, for FQDNs. More specifically, the method includes modifying the tokenization step: BERT relies on Word Piece tokenization to identify basic word components, e.g., splitting "cars" into "car" and "s" and determines the tokens for which to learn embeddings. Instead, the method of one or more embodiments utilize and take advantage of the hierarchy of domains, which was designed to manage and resolve domains, to define the individual tokens.

Second, the method applies the above algorithm to allow embeddings to capture the semantic information behind FQDNs, and significantly improve deep models' generalization performance, according to one or more embodiments. Continuing the previous example, the performance of the GRU-based IoT device type predictor improves from 0.592 to 0.965 when applied to the same independent dataset, but with embeddings learned through the disclosed algorithm. Here is a comparison of the performance when using context independent embeddings: with context independent embeddings, the performance of the downstream model on the independent dataset remains poor at 0.585. These experiments demonstrate the benefits of using BERT and deriving contextual embeddings for FQDNs, according to one or more embodiments.

Third, further analysis was performed for the learned embeddings and for present (unsupervised) tasks that network administrators could perform using these novel embeddings (e.g., analysis of user behaviors).

Moreover, it should be appreciated that the disclosure describes approaches for learning contextual embeddings that capture semantic relationships for network categorical values other than FQDNs, although FQDNs are illustrated for explanation purposes. In particular, the method of one or more embodiments can find meaningful relationships: for example, HTTP and HTTPS services are discovered to be semantically very similar; and strong transport layer security (TLS) cipher suites that rely on the same set of algorithms and differ only in the keys' lengths are also discovered to be close.

II. Word Embeddings in NLP

This section provides a brief overview of example techniques for creating word embeddings in NLP. Word embeddings are needed because deep neural networks cannot process strings (i.e., text), only numerical vectors. As such, converting text to vectorial representations in high-dimensional latent spaces has been an active research area. Although one hot encoding provides a simple numerical representation for categorical values, one hot encoding does not capture any semantic information between words. Instead, every pair of words is equidistant in the latent space.

Word2Vec is a popular technique to learn numerical representations for words that capture their semantic meaning via proximity. Two words that are close in meaning (e.g., "king" and "queen") would have word embeddings (numerical vectors) that are close in distance (e.g., cosine similarity). To achieve this, Word2Vec relies on two neural network variants that calculate word embeddings based on the words' context: Continuous Bag-of-Words (CBOW) predicts the current word based on the context, and Skip-gram instead predicts the closely related context words to an input word.

Global Vectors for Word Representation (GloVe) is an extension of Word2Vec that captures global contextual information in a text corpus. More specifically, while Word2Vec ignores the frequency of co-occurrence of words (i.e., the number of times word j occurs in the context of word i), GloVe computes word embeddings taking co-occurrence into account. For this reason, GloVe embeddings are often considered a representation of the training corpus in lower dimensionality, thereby reflecting the word-word contextual relationships.

Bidirectional Encoder Representations from Transformers (BERT) is used to compute contextual embeddings. Word2Vec and GloVe compute context independent embeddings: given a word, its numerical representation is the same regardless of its position in a sentence or the different meanings it may have. For example, in the sentence "Alice had a picnic by the river bank, and then went to the bank to open an account", the two occurrences of the word "bank" have the same embedding. In contrast, with BERT, the two occurrences of the word "bank" have different embeddings.

To achieve this, a tokenizer splits the text into words or subwords (e.g., "banks" would be decomposed into "bank" and "s"). Then, BERT is trained on two unsupervised tasks. As the first task using a masked language model (LM), a fraction of the words in the text are replaced with a MASK token, and the model's goal is to predict the original value of the masked words. However, compared to previous solutions which read the text input sequentially (e.g., left-to-right, or right-to-left), BERT applies the bidirectional training of a Transformer, which is an attention model, to language modelling. This allows the BERT model to learn the context of a word based on all of its surroundings. As the second task of using next sentence prediction, given two sentences, the model is to predict whether the second sentence is the next sentence to the first one in the initial text, or if the second sentence has been randomly sampled.

III. Contextual Embeddings for Data Networks

The method of one or more embodiments discloses learning contextual embeddings (i.e., numerical representations that capture semantic relationships within a sequence) for categorical variables used by deep neural networks trained for network analysis and management tasks, to thereby improve their performance.

A. Categorical Variable

Categorical data or categorical variables are a type of data that is used to group information with similar characteristics, while numerical data is a type of data that expresses information in the form of numbers. Machine learning algorithms cannot process categorical variables unless they are converted numerical values. Many algorithm's performances even vary based upon how the categorical variables are encoded. One or more embodiments provide novel methods to structure categorical variables for network traffic, thereby providing improvements to classifying descriptions/characteristics of end points (devices) and to detecting anomalies for end points.

To address categorical variables, attention is directed to fully qualified domain names (FQDN), which are the complete, human-readable domain name (e.g., mascots.iitis.pl) for servers on the Internet, although one or more embodiments relate to other network traffic including protocol fields, protocol values, cyber security, etc. This is because FQDNs are semantically rich, and either explicitly or implicitly, carry a lot of information. For example, in the FQDN "x.y.z", the Top Level Domain (TLD) "z" distinguishes commercial enterprises (".com"), government entities (".gov"), educational institutions (".edu"), and nonprofit organizations (".org"); or can also indicate the country where the domain is hosted: ".ca" for Canada, ".uk" the United Kingdom, etc. The Second Level Domain (SLD) "y" commonly indicates the organization that registered the domain name with a registrar. Subsequent domains may indicate services, departments, or other structures in that organization.

Given their semantic richness, a large number of solutions rely on the analysis of FQDNs to detect botnets, phishing, spam, abnormal activities, and for classification. As such, the disclosure investigates whether recent techniques developed in NLP can capture this information and derive semantically meaningful embeddings for FQDNs, according to one or more embodiments.

B. Tokenize FQDNs

Tokenizers play an important role in the semantic relations that NLP models learn from a corpus. Because FQDNs have their own syntax, they require a custom tokenization approach.

One or more embodiments of the invention are configured to utilize the hierarchical structure of FQDNs. While FQDNs may simply appear as strings of numbers, letters, and hyphens, with a maximal length of 255 characters, they actually embed a hierarchical structure, where the hierarchy levels of an FQDN are read from right to left, with full stops acting as delimiters between the different levels. As such, the method of one or more embodiments truncates each FQDN to the k-th level, where k is a hyperparameter that allows one to control the vocabulary size. More precisely, the method of one or more embodiments replaces every FQDN, (FQDN.) with the corresponding token: token="." join(FQDN.split (".")[:min(k,len(FQDN.split("."))])).

C. Contextualizing the Embeddings

Neural language models have made strides in language understanding through their ability to contextualize the tokens from a given input sequence. For example, in the sentence, "I visited the river bank, then went to the bank to make a withdrawal," the token "bank" takes on two entirely separate meanings based on context: the first refers to a geographical feature, while the second to a financial institution. A straightforward mapping of single tokens to single embeddings will struggle to reflect this semantic dual nature. An encoder-based neural language model restores this ability, however, by remapping input embeddings to better reflect the context of the input sequence, e.g., the embedding for the first "bank" may get shifted closer to that for "shore", while the second "bank" may move closer to "ATM". By learning and remapping the input embeddings, the language model gains the ability to extract high-level semantic information from a given input sequence, which has proven useful for many downstream tasks.

For network operation using BERT, one or more embodiments utilize a similar contextualization/remapping operation to capture the high-level semantics of network traffic sequences, using a small BERT-based model (e.g., machine learning model 150). In one or more embodiments, one training task used is the standard masked language modeling task where, given an input sequence, 15% of tokens are randomly chosen as training anchors, where 80% of those training anchors (tokens) are replaced with a standard masking token, and the model (e.g., machine learning model 150) must fill in the blanks from its learned vocabulary. A separate 10% of anchors (tokens) are left unchanged, to encourage the model (e.g., machine learning model 150) to preserve the meanings of unaltered non-anchor tokens, and the remaining 10% are replaced with a random token from the vocabulary, to encourage the model to contextualize all tokens in the sequence, rather than only those that are masked off. An optimizer and a linear annealing schedule are used for learning rate. The training sequence length ranges from 8 to 64, resampled every batch. Further hyperparameters and architecture details are provided in Table 1 in FIG. 4. In FIG. 4, Table 1 illustrates a summary of BERT hyperparameters and variables used for training.

IV. Experiments

Various experiments were conducted to evaluate the benefits of contextual embedding for network analysis, resulting in the machine learning model 150 according to one or more embodiments. Datasets, network tasks, and then results are discussed. Although examples of experiments are discussed for pre-processing and training the machine learning model 150, it should be appreciated that the details of the experiments are for explanation purposes. Although one or more embodiments can utilize the features, embodiments are not meant to be limited by the details of the experiments.

A. Datasets

The datasets consisted of packet capture (pcap) from three independent environments: Smart Lab—UNSW, Smart Lab—private, and a large enterprise network.

Smart Lab—UNSW is a lab with 21 IoT devices, including cameras, switches and triggers, hubs, air quality sensors, electronics, healthcare devices, and light bulbs was setup, and all traffic was collected, for two weeks in 2016, using tcpdump. The devices are labeled with the manufacturers and device types (e.g., Amazon Echo®, Netatmo Welcome®, etc.)

Smart Lab—Private, which is instrumented very similarly to the previous one, is a private lab that comprises 65 IoT devices from 31 vendors (e.g., Amazon®, Apple®), and 24 different types (e.g., TV, bulbs, camera, doorbell, hub, refrigerator, thermostat, etc.). The devices are also labeled with their manufacturer and type. The focus was on their traffic captured over 31 days in 2017.

Large enterprise network represents traffic from an enterprise network located in North America. The traffic comprises slightly more than 3,000 hosts including servers, laptops, and phones, which were captured at the border routers with the Internet for several 24 hour periods. The devices are not labeled.

During the experiments, the methods preprocessed each dataset by applying a network analysis framework that parses packet captures and extracts fields of interest. The focus was on the DNS traffic, and the method defined an instance (or session) as a sequence of N successive FQDNs queried by a same device (e.g., same end point). The sequences were labeled with the type and manufacturer of the IoT devices (e.g., end points) that originated them.

B. Methodology

During the training, the experiment considered the tasks of predicting the (1) IoT device type (e.g., camera, doorbell, hub, etc.) and (2) their manufacturer (e.g., Amazon®, Apple®, Belkin®) from passive network monitoring. More specifically, after observing N (e.g., 32) successive DNS queries that a device (end point) queried, the experiment is to determine if a model can correctly predict its device type and manufacturer, which ultimately resulted in the machine learning model 150. The inventors trained gated recurrent units (GRU) models, which are a popular variant of recurrent neural networks architectures, and often considered an improvement to long short-term memory (LSTM) networks. Details of the model architecture, hyperparameters, and other variables are provided in Table 2 in FIG. 5. In FIG. 5, Table 2 illustrates a summary of classifier hyperparameters and variables.

Passive network monitoring is a technique involves capturing and analyzing live network traffic or traffic statistics, at a specific point in the network. As its name suggests, passive monitoring does not require another site in the network to be involved or even aware.

Now turning to performance metrics, to evaluate the models' generalization performance, the inventors first trained the models on the larger labeled dataset, i.e., Smart Lab—Private. Focus was on the classes that have a large enough support (i.e., number of instances is larger than a threshold). The entire dataset was split into training and testing subsets along a 75:25 ratio, and the weighted average F-1 score on the test subset was analyzed to avoid overfitting. Then, the trained models were applied to the other independent labeled dataset, i.e., Smart Lab—UNSW. Because the two datasets have a number of common but also different classes, the inventors only considered the instances from Smart Lab—UNSW that belong to classes seen during the training phase. Finally, the inventors computed and compared the average weighted F-1 score on the independent dataset.

Now turning to the embeddings, to convert the FQDNs into numerical vector representations to be processed by neural networks, the inventors compute and compare embeddings using three approaches. However, before describing each of them in detail, the training corpus and the common preprocessing operations are discussed.

First, the methods of one or more embodiments created a training corpus from the sequences of successive FQDNs queried by the same device (e.g., the same end point), from all three datasets (e.g., as described in Section IV-A). Learning embeddings does not require labels, and as such, the network trace from the large enterprise network can also be exploited. Second, the methods preprocessed the training corpus by filtering out domains that are of little value. For example, FQDNs were excluded that ended with "in-addr.arpa", which are mainly used for reverse DNS. This is similar to removing stop words in natural language processing. In addition, to reduce the vocabulary size, and allow a fair comparison across the methods, the FQDNs were truncated to the same level (e.g., as discussed Section III-B) with k set to, for example, 3. Finally, the inventors implemented and compared the following approaches for computing embeddings using the tokens generated according to one or more embodiments: in the random approach, this a simple and common approach that consists in initializing the embedding to random values, which are then adjusted through backpropagation. In the GloVe approach, this learns context independent embeddings for the FQDNs through GloVe (e.g., as discussed in Section II). In the NorBERT (network representations through BERT) approach, this is where the inventors trained an FQDN embedding contextualization model using the procedure outlined in Section III-C, in accordance with the one or more embodiments.

C. Results

The results are summarized in Table III in FIG. 6, which is a summary of classifying the device type and manufacturer for each embedding (e.g., random, GloVe, and BERT) along with their average weighted F-1 scores for the training dataset versus the independent validation dataset. First, it was observed that with randomly initialized embeddings, the performance of the models, both for predicting the device type and the manufacturer, suffer significant drops from F-1 scores larger than 0.996 on the training dataset, to scores lower than 0.588 on the independent validation dataset. Those numbers confirm the model generalization problem for network analysis tasks (e.g., discussed in Section I). Second, it was noted that context independent embedding learned through GloVe may improve the performance. For example, the model to predict the device's manufacturer increased its F-1 score on the independent validation dataset from 0.588 to 0.726 thanks to context independent embeddings. Furthermore, contextual embeddings computed through the NorBERT approach (e.g., using machine learning model 150) of embodiments allow models to outperform other approaches. The average weighted F-1 scores of the models to predict device type and manufacturer reach 0.965 and 0.906, respectively, when embeddings are determined using BERT according to one or more embodiments. These large improvements demonstrate the benefits of contextual embeddings, and their ability to increase the models' generalization performance, according to one or more embodiments.

V. Further Analysis

The learned embeddings are further analyzed. For example, for a given FQDN, the nearest neighbor can be retrieved (e.g., using the cluster algorithm/model 250). In NLP, the nearest neighbor search has been an important building block for real world applications such as text search and recommender systems. The disclosure shows how such analysis in the context of FQDNs can reveal new insights and enable new unsupervised analysis tasks, according to one or more embodiments.

A. Nearest Neighbor

To verify the quality of word embeddings, NLP studies often look at words and their most similar words. For example, the word "France" should intuitively be similar to "Spain", or some other countries. First, a similar analysis was conducted, using the learned embeddings from NorBERT model (e.g., machine learning model 150). The focus was on the packet capture from the large enterprise network. Given a list of FQDNs, the inventors retrieved their nearest neighbor using the cosine similarity (which can be performed by the cluster algorithm/model 250) to compute the distance between any pair of embeddings.

Table 4 in FIG. 7 presents an excerpt of the results from the nearest neighbors computation. The inventors determined that the first set of FQDNs and their nearest neighbors do appear similar: they are American or English websites with articles in politics, foreign affairs, business, culture, or technology. Similarly, the next sets of FQDNs may have different second level domains (SLD) (e.g., Windows®, Bing®, Windows® update), or third level domain, but they all appear to be owned by the same organization. For the last set of FQDNs in Table 4, they all point to computers in the enterprise network. The second level domain has been anonymized with a fixed number of characters "#". Network administrators in that enterprise assign a default hostname to computers starting with either "desktop-", "laptop-", or "win-" and followed by a unique identifier, which is also anonymized.

However, for many such computers, their nearest neighbor seems to be another computer from the same domain. These results confirm that the embeddings capture semantic relationships between FQDNs, and the latest observation indicates that computers in that enterprise form clusters and can point to outliers, according to one or more embodiments of the invention.

B. Unsupervised Learning

Figure 11:
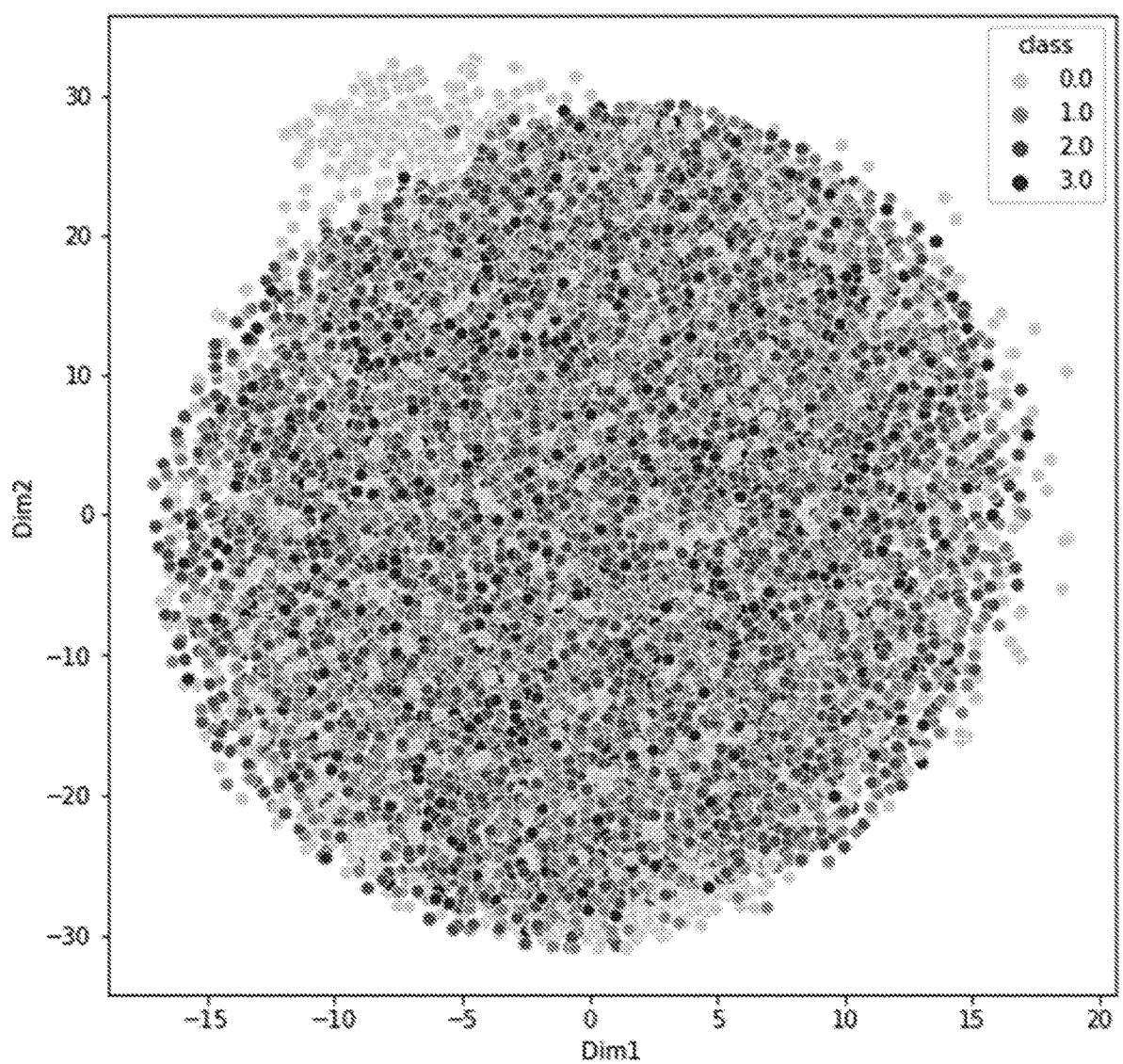
FIG. 11 is a graph of a projection of the fully qualified domain names embeddings from a large enterprise network into a two-dimensional plane according to one or more embodiments of the present invention.

Insights from the previous analysis (Section V-A) indicates that FQDNs with similar semantics may cluster together and can help unearth patterns. As such, the inventors explore and visualize the data through projection, particularly by projecting the high dimensionality embeddings (128 dimensions) into a two-dimensional plane using t-distributed Stochastic Neighbor Embedding (t-SNE), which a nonlinear dimensionality reduction algorithm. FIG. 11 depicts a graph of the projection of the FQDN embeddings from the large enterprise network into a two-dimensional plane using t-SNE. In FIG. 11, a point in the graph represents a FQDN. It is expected that users' computer would have similar embeddings. Any user's computer that differs significantly may indicate an unexpected behavior (e.g., misconfiguration). To detect any such end point, the inventors distinguished FQDNs starting with the prefix "laptop-", "desktop-", and "win-" respectively, and ending with the second level domain of that enterprise with a different color, and the label 1, 2, and 3, respectively.

It was observed that the FQDNs starting with the prefix "laptop-", "desktop-", and "win-", and ending with the second level domain of that enterprise, actually form a compact cluster with no outstanding outlier, which is a desirable property for network administrators. In contrast, some embeddings, in the upper left corner of the graph in FIG. 11 appear to protrude from the main cluster. Table 5 in FIG. 8 presents an excerpt of those FQDNs. Their names indicate that a majority of them correspond to mirror servers and repositories. Intuitively, those servers behave differently from the users' computers. These results confirm that exploration of FQDN embeddings can reveal new patterns and insights, according to one or more embodiments.

In addition to visual inspection, a more systematic approach to explore the data and discover patterns can include applying hierarchical clustering, for example, suing cluster algorithm/model 250.

C. From Token to Sequence

A major characteristic of contextual embeddings lies in their ability to derive numerical representations whose values can change based on the context. As such, analyzing sequences of FQDNs, rather than standalone FQDNs, further utilizes their strength according to one or more embodiments. For example, one can passively monitor the DNS queries submitted by each host (e.g., end point (e.g., user computer)) using network traffic monitoring software, create sequences of N FQDNs using the software application 152, and compute their embeddings using the machine learning model 150. Then, analysis of the sequence embeddings through projection and visual inspection and/or through hierarchical clustering via the cluster algorithm/model 250 reveals abnormal user behaviors, thereby detecting potential cyber security threats to a computer network, computer systems, databases, etc., according to one or more embodiments of the invention.

To illustrate this, attention is directed to a different 24 hour trace from the large enterprise network than the one that was used in Section IV-B. A sequence is defined as the list of N successive FQDNs queried by a single host (e.g., end point). This sequence is fed into NorBERT (e.g., machine learning model 150) to compute the contextualized embedding for each FQDN. The software application 152 is used to then derive the sequence embedding as the mean of the N contextual embeddings. Finally, the software application 152 is again used project the sequence embeddings into a two-dimensional plane using t-distributed Stochastic Neighbor Embedding (t-SNE).

Figure 12:
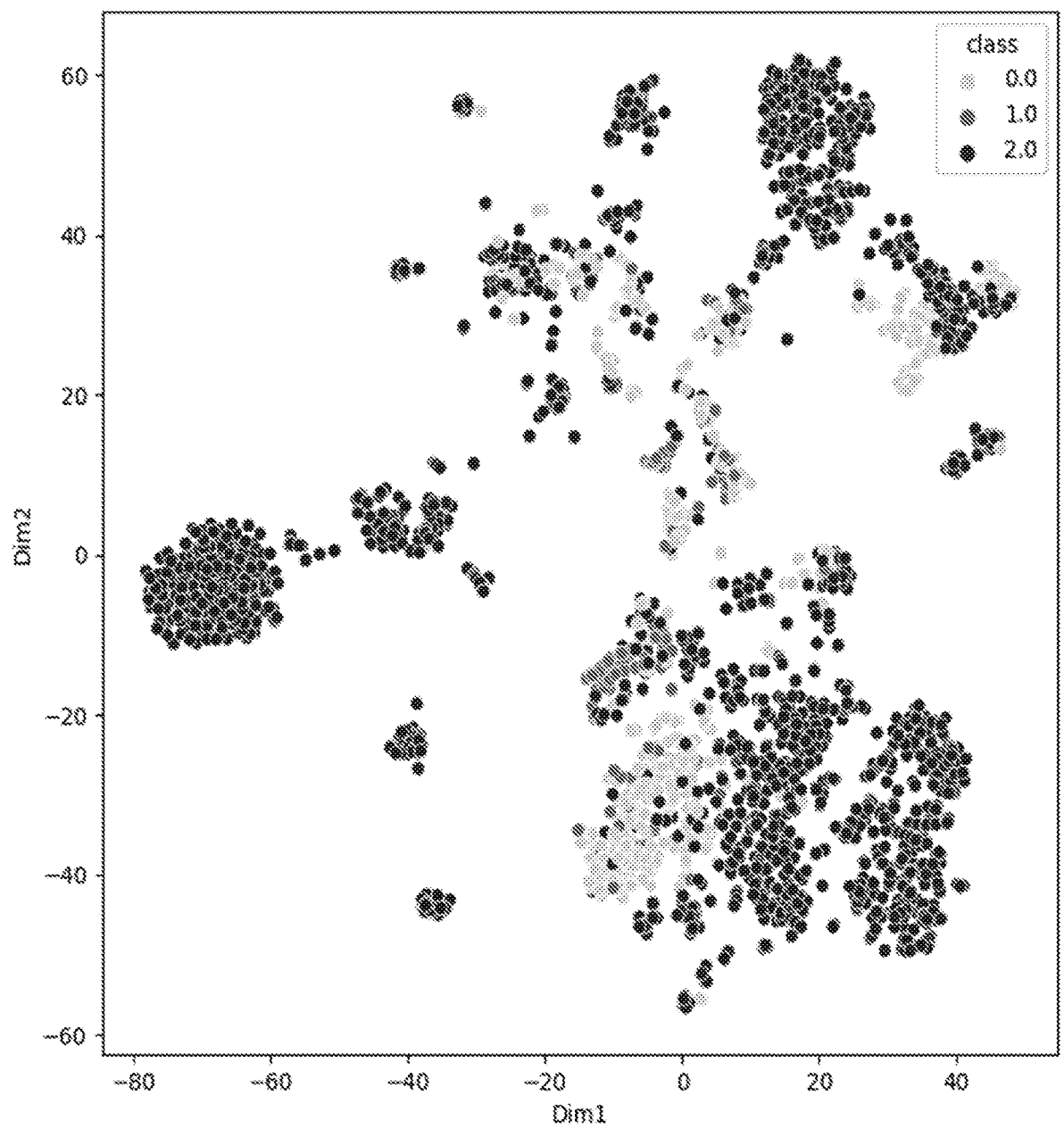
FIG. 12 is a graph of a projection of the sequence embeddings from a large enterprise network into a two-dimensional plane using t-SNE according to one or more embodiments of the present invention.

FIG. 12 is a graph of a projection of the sequence embeddings from the large enterprise network into a two-dimensional plane using t-SNE. In FIG. 12, each dot in the graph represents the embedding of a sequence of N FQDNs queried by a single host (e.g., a computer system). If the hostname of that endpoint (e.g., computer system) includes specific sub-strings indicating the host is a desktop or a laptop, the dot is marked with a value of 0 or 1, respectively. All other hosts are marked with a value of 2. Network administrators (or the software application 152) can then look more closely at the outliers. An outlier indicates a sequence of FQDNs that is considerably different from those typically observed by other members of a class (e.g., laptop, desktop). Note that compared to the uncontextualized FQDN embeddings in FIG. 11, the contextualized host sequence embeddings are far more distinctively clustered and semantically rich, indicating that NorBERT (e.g., machine learning model 150) truly is contextualizing meaningfully, and performing non-trivial network traffic analysis, despite the lack of any human-annotated labels or guidance during the training process, according to one or more embodiments.

VI. Further Analysis of Network Traffic

This section discusses approaches to and presents results on learning contextual embeddings for categorical variables other than FQDN. While some sections have shown how embeddings for FQDN can be computed and then used for different network analysis tasks, one or more embodiments can be used to compute embeddings for other network categorical variables. For example, because the destination port represents the server application, destination port 80 may be considered semantically closer to port 5684 than port 22. Similarly, because the cipher suite field in the TLS handshake represents the set of algorithms used to secure connections, some cipher suites may be considered semantically closer (e.g., strong versus weak).

To learn embeddings for network categorical variables that capture such information, the preprocessing operations for learning embeddings may include defining the context and the tokens. For example, network traffic is often viewed as a sequence of bytes. In such a case, one or more embodiments determine what the delimiters and tokens are. In natural language processing, white space and punctuation are commonly used as delimiters to extract tokens. One or more embodiments provide the equivalent of white space and punctuation for network data. Particularly, to address this, one or more embodiments define network data at a higher level than sequences of bytes. The disclosure identifies that bytes are in reality the implementation of protocols and the exchange of information, between clients and servers. As such, network data can be treated as sequences of (protocol field, protocol value) pairs. FIG. 9 depicts Table 6 which shows different views of network data. As illustrated in Table 6 of FIG. 9, network traffic analyzers rely on protocol parsers to extract protocol fields and values and present them to users who can then analyze the data more easily. According to one or more embodiments, a token can then be a protocol field followed by a protocol value, and the equivalent of a sentence from natural language processing can be a sequence of tokens as depicted in Table 7 of FIG. 10. FIG. 10 is an example representation of network data.

Now turning to experiments to evaluate what information network embeddings learned using such token definition and that context would capture, the focus is directed to the "Smart Lab—UNSW" trace, where the inventors extracted a number of protocol fields (e.g., ip.src host, ip.dst host, udp.srcport, udp.dstport, tcp.srcport, tcp.dstport, icmp.type, dns.qry.name, http.server, http.request.method, http.request.uri, http.host, ssl.handshake.ciphersuite, http.user agent, etc.) using tshark. The inventors created sequences of N tokens and learned contextual embeddings (e.g., using the machine learning model 150) through the procedure described in Section III-C.

Example results: similar to the analysis in Section V-A, in order to verify the quality of the learned embeddings (e.g., output by the machine learning model 150), given a token, the inventors retrieved its nearest neighbor (e.g., using the cluster algorithm/model 250). For example, considering the token "80", the closest neighbor is "443". Destination port 80 represents HTTP, while destination port 443 represents HTTPS. Those results are therefore according to a good intuition. Next, considering the token "49199" which is the code for the ciphersuite "ECDHE+RSA authentication AES-128 GCM SHA-256", its closest neighbor is token "49200" which is the code for ciphersuite "ECDHE+RSA authentication AES-256 GCM SHA-384". Those two codes represent the same algorithms and differ only in the keys' lengths. As such, the proximity of these codes is again according to good intuition. In summary, the results indicate that the embeddings (e.g., output from the machine learning model 150) can learn meaningful relationships for different network categorical variables, though downstream evaluation tasks.

VII. Conclusion

As can be seen, as technical solutions and benefits, the inventors have adapted the NLP pretraining technique and associated deep model BERT (e.g., machine learning model 150) to learn semantically meaningful numerical representations (embeddings) for Fully Qualified Domain Names (FQDNs) used in communication networks. It has been demonstrated that applying the above approach allows embeddings to capture the semantic information behind FQDNs, and significantly improve deep models' generalization performance. A series of experiments were run to show the benefits of using BERT and deriving contextual embeddings for FQDNs. As further analysis of the learned embeddings, it has been shown that (unsupervised) tasks can be performed by the network administrators using these novel embeddings (e.g., analysis of user behaviors) and/or clustering software. Additionally, approaches have been described for learning embeddings that capture semantic relationships for network categorical values, other than FQDNs, and results have been discussed.

Figure 13:
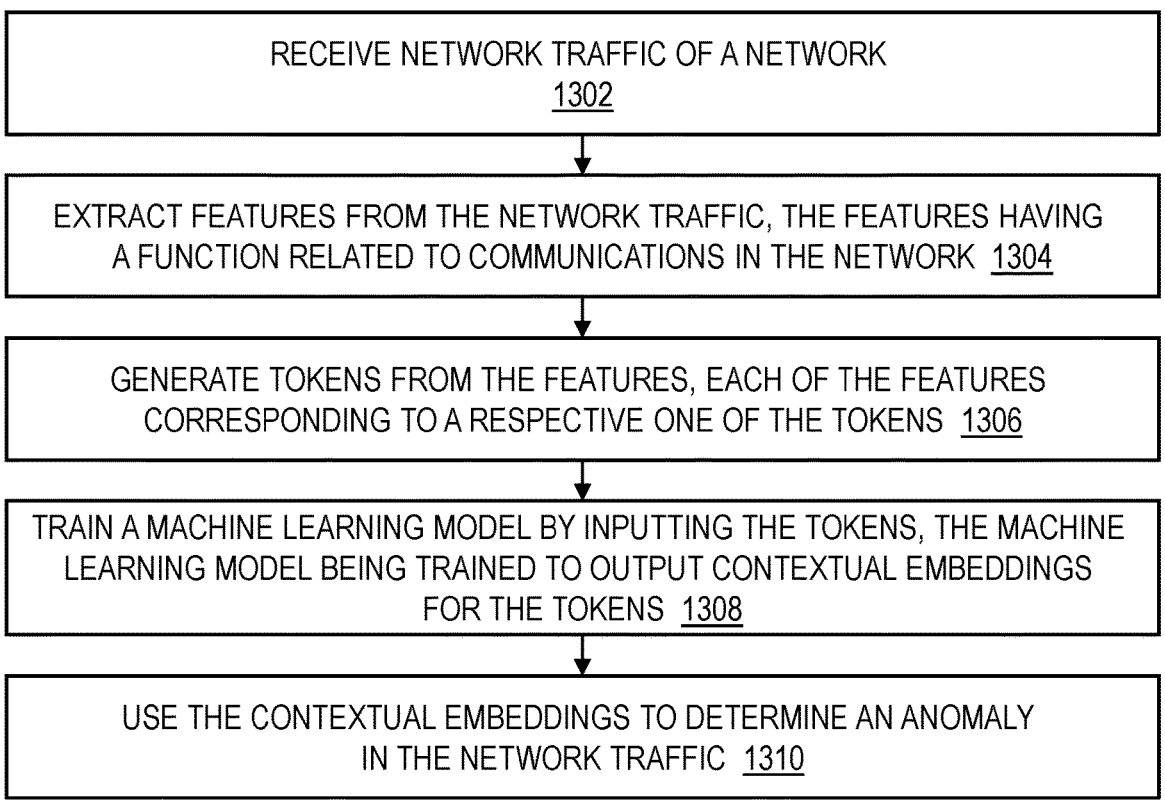
FIG. 13 is a flowchart of a computer-implemented method for using the machine learning model to generate contextual embeddings for tokens of categorical features of networks, such that those contextual embeddings with contextual meanings are used to detect anomalies in network traffic of a network according to one or more embodiments of the present invention.

FIG. 13 is a flowchart of a computer-implemented method 1300 for using the machine learning model 150 to generate contextual embeddings for tokens of categorical features of networks, such that those contextual embeddings with contextual meanings are used to detect anomalies in network traffic of a network according to one or more embodiments. Reference can be made to any of the figures discussed herein.

At block 1302 of the computer-implemented method 1300, the software application 152 is configured to receive/obtain network traffic of a network (e.g., WAN 102 or another network). At block 1304, the software application 152 is configured to extract categorical features from the network traffic (e.g., the network data 210), the categorical features having a function related to communications in the network. At block 1306, the software application 152 is configured to generate tokens (e.g., tokens 220) from the categorical features, each of the features corresponding to a respective one of the tokens. At block 1308, the software application 152 is configured to train a machine learning model 150 by inputting the tokens (e.g., tokens 220), the machine learning model 150 being trained to output contextual embeddings (e.g., numerical representations, such as vectors) for the tokens. At block 1310, the software application 152 is configured to use the contextual embeddings to determine an anomaly in the network traffic.

Further, one or more of the tokens 220 are masked during the training of the machine learning model 150. The machine learning model 150 is configured to predict the contextual embeddings for masked tokens. One of the contextual embeddings has a relationship to another one of the contextual embeddings. For example, one contextual embedding can represent (via a token) a fully qualified domain name in a communication session for an end point and another contextual embedding can represent another fully qualified domain name in the same communication session for the end point (device), where both contextual embeddings correspond to the same sentence of tokens for the end point.

Additionally, first ones of the contextual embeddings are generated from a first sentence of the tokens; and second ones of the contextual embeddings are generated from a second sentence of the tokens, the first sentence being associated with a first end point in the network, the second sentence being associated with a second end point in the network. The categorical features comprise a hierarchical relationship. The categorical features are selected from the group consisting of fully qualified domain names, protocol fields, and/or protocol values. The features comprise a sequence of fully qualified domain names (FQDNs), the tokens being generated by truncating each of the FQDNs to a predetermined level in a hierarchical structure of a domain name system; and/or the features comprise packet traces of the network traffic, the tokens being generated by converting a packet trace into a sequence of protocol field and value pairs Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving network traffic of a network;
extracting features from the network traffic, the features having a function related to communications in the network, wherein the features comprise a sequence of fully qualified domain names (FQDNs);
generating tokens from the features, each of the features corresponding to a respective one of the tokens;
training a machine learning model by inputting the tokens, the machine learning model being trained to output contextual embeddings for the tokens, wherein one or more of the tokens are masked by corrupting the one or more of the tokens during the training of the machine learning model; and
using the contextual embeddings to determine an anomaly in the network traffic.

2. The computer-implemented method of claim 1, wherein the machine learning model is configured to predict the contextual embeddings for masked tokens.

3. The computer-implemented method of claim 1, wherein one of the contextual embeddings has a relationship to another one of the contextual embeddings.

4. The computer-implemented method of claim 1, wherein:
first ones of the contextual embeddings are generated from a first sentence of the tokens; and
second ones of the contextual embeddings are generated from a second sentence of the tokens, the first sentence being associated with a first end point in the network, the second sentence being associated with a second end point in the network.

5. The computer-implemented method of claim 1, wherein:
the tokens are generated by truncating each of the FQDNs to a predetermined level in a hierarchical structure of a domain name system; or
the features comprise packet traces of the network traffic, the tokens being generated by converting a packet trace into a sequence of protocol field and value pairs.

6. The computer-implemented method of claim 1, wherein the features are selected from the group consisting of fully qualified domain names, protocol fields, and protocol values.

7. A system comprising:
a memory having computer readable instructions; and
a computer for executing the computer readable instructions, the computer readable instructions controlling the computer to perform operations comprising:
receiving network traffic of a network;
extracting features from the network traffic, the features having a function related to communications in the network, wherein the features comprise a sequence of fully qualified domain names (FQDNs);
generating tokens from the features, each of the features corresponding to a respective one of the tokens;
training a machine learning model by inputting the tokens, the machine learning model being trained to output contextual embeddings for the tokens, wherein one or more of the tokens are masked by corrupting the one or more of the tokens during the training of the machine learning model; and
using the contextual embeddings to determine an anomaly in the network traffic.

8. The system of claim 7, wherein the machine learning model is configured to predict the contextual embeddings for masked tokens.

9. The system of claim 7, wherein one of the contextual embeddings has a relationship to another one of the contextual embeddings.

10. The system of claim 7, wherein:
first ones of the contextual embeddings are generated from a first sentence of the tokens; and
second ones of the contextual embeddings are generated from a second sentence of the tokens, the first sentence being associated with a first end point in the network, the second sentence being associated with a second end point in the network.

11. The system of claim 7, wherein:
the tokens are generated by truncating each of the FQDNs to a predetermined level in a hierarchical structure of a domain name system; or
the features comprise packet traces of the network traffic, the tokens being generated by converting a packet trace into a sequence of protocol field and value pairs.

12. The system of claim 7, wherein the features are selected from the group consisting of fully qualified domain names, protocol fields, and protocol values.

13. A computer program product comprising a computer readable storage medium having program instructions embodied therewith, the program instructions executable by a computer to cause the computer to perform operations comprising:
receiving network traffic of a network;
extracting features from the network traffic, the features having a function related to communications in the network, wherein the features comprise a sequence of fully qualified domain names (FQDNs);
generating tokens from the features, each of the features corresponding to a respective one of the tokens;
training a machine learning model by inputting the tokens, the machine learning model being trained to output contextual embeddings for the tokens, wherein one or more of the tokens are masked by corrupting the one or more of the tokens during the training of the machine learning model; and
using the contextual embeddings to determine an anomaly in the network traffic.

14. The computer program product of claim 13, wherein the machine learning model is configured to predict the contextual embeddings for masked tokens.

15. The computer program product of claim 13, wherein one of the contextual embeddings has a relationship to another one of the contextual embeddings.

16. The computer program product of claim 13, wherein:
first ones of the contextual embeddings are generated from a first sentence of the tokens; and
second ones of the contextual embeddings are generated from a second sentence of the tokens, the first sentence being associated with a first end point in the network, the second sentence being associated with a second end point in the network.

17. The computer program product of claim 13, wherein:
the tokens are generated by truncating each of the FQDNs to a predetermined level in a hierarchical structure of a domain name system; or the features comprise packet traces of the network traffic, the tokens being generated by converting a packet trace into a sequence of protocol field and value pairs.

\* \* \* \* \*